Figure 1:
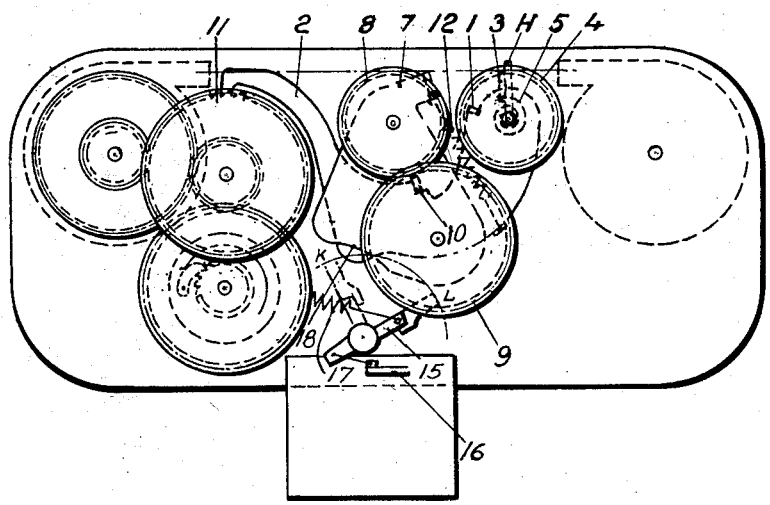

Dec. 16, 1952     A. V. H. ANDERSSON     2,621,561
CAMERA FOR REPRODUCTIVE PURPOSES

Filed Nov. 29, 1949     4 Sheets-Sheet 1

INVENTOR
ANDERS VIKTOR HUGO ANDERSSON
By C.L. Freeman
ATTY.

Dec. 16, 1952   A. V. H. ANDERSSON   2,621,561
CAMERA FOR REPRODUCTIVE PURPOSES
Filed Nov. 29, 1949   4 Sheets-Sheet 2
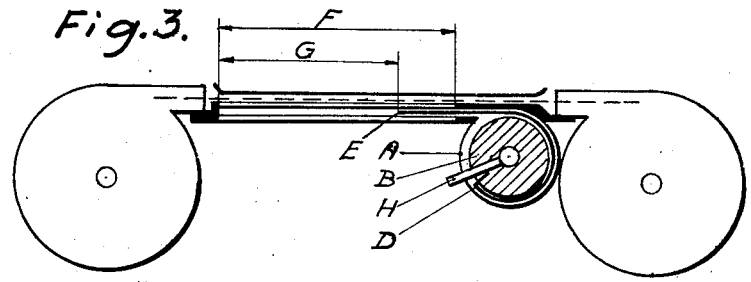
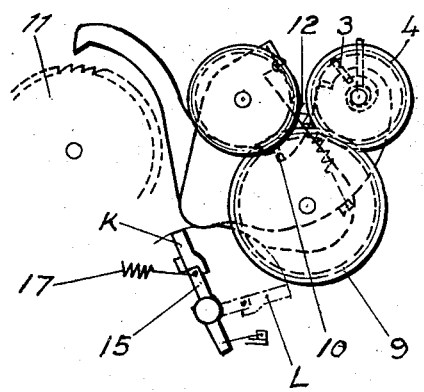
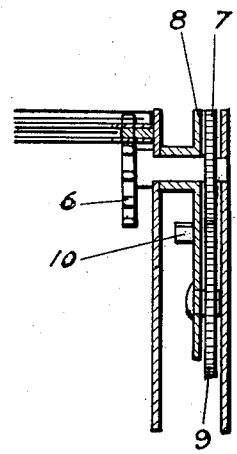
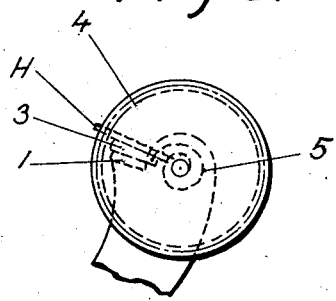
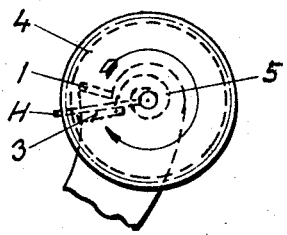
INVENTOR
ANDERS VIKTOR HUGO ANDERSSON Dec. 16, 1952 A. V. H. ANDERSSON 2,621,561
CAMERA FOR REPRODUCTIVE PURPOSES
Filed Nov. 29, 1949 4 Sheets-Sheet 3

INVENTOR
ANDERS VIKTOR HUGO ANDERSSON
By C. J. Freeman
ATTY

INVENTOR
ANDERS VIKTOR HUGO ANDERSSON
BY E J Freeman
ATTY.

Patented Dec. 16, 1952

2,621,561

UNITED STATES PATENT OFFICE 2,621,561

CAMERA FOR REPRODUCTIVE PURPOSES

Anders Viktor Hugo Andersson, Uppsala, Sweden

Application November 29, 1949, Serial No. 129,953
In Sweden September 25, 1947

5 Claims. (Cl. 88—24)

The present invention relates to a camera for reproductive photographing, characterized therein that it is provided with a blind arranged in front of the negative, said blind being displaceable by means of a handle for adjusting the field of image of the camera, and in that the said handle is also arranged to adjust a member which at the feeding of the film is adapted to stop the preferably spring-actuated feeding device when the feeding of the film has advanced in correspondence to the position the said member thus obtained, so that the feeding of the film agrees with the size of the field of image, which is determined by the setting of the blind.

The annexed drawings illustrate an embodiment of the invention. Of course the details of the construction shown in the drawings and described in the following text may vary in some respect or other without departing from the spirit of the invention.

Figure 2:
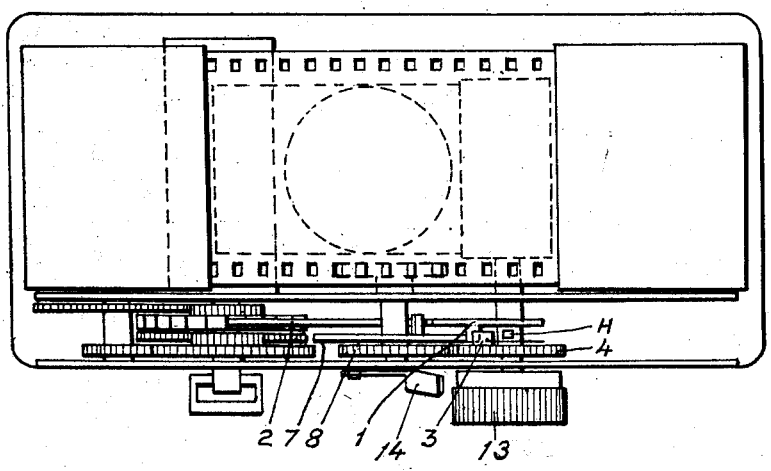
Figure 8:
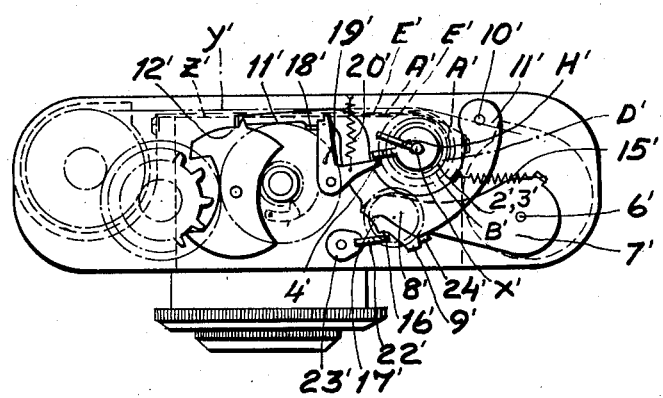
Figure 9:
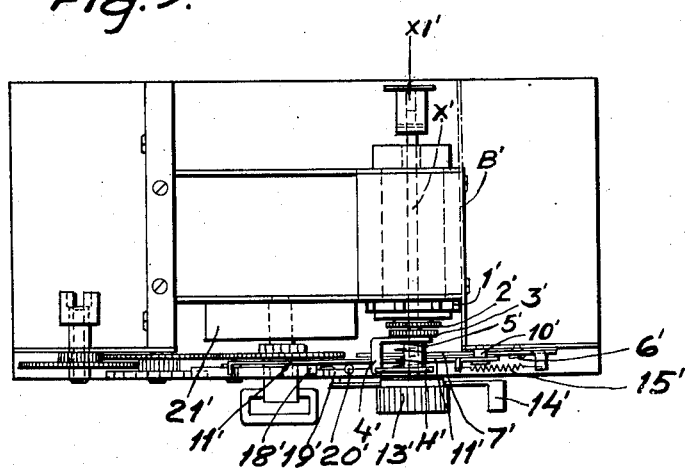
Figure 10:
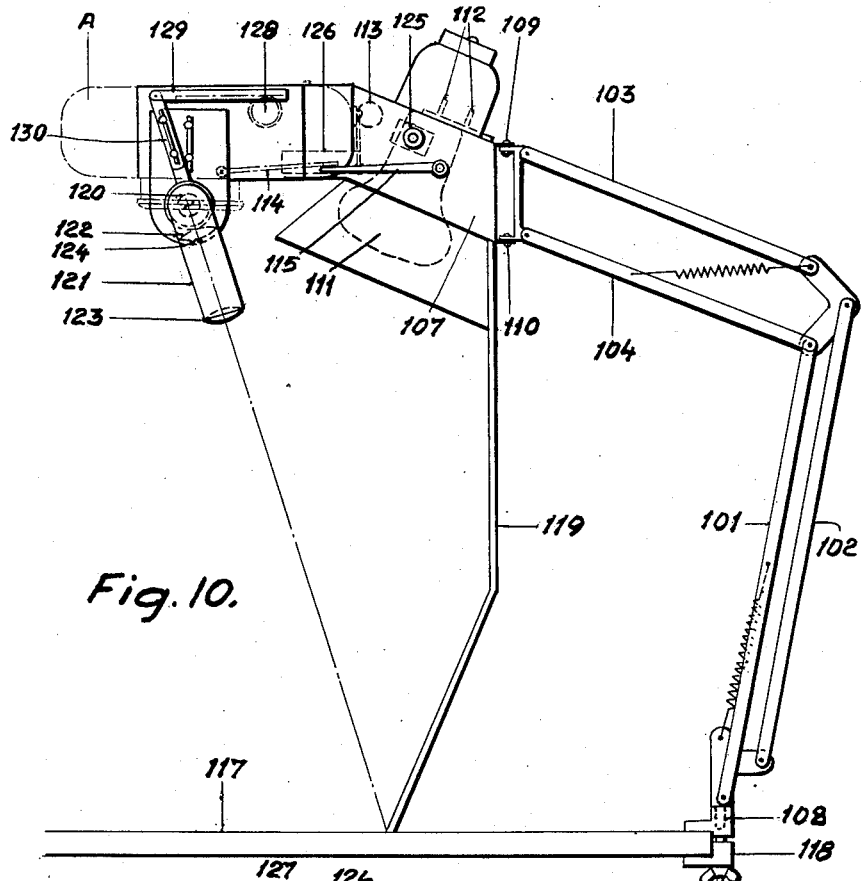
Figure 11:
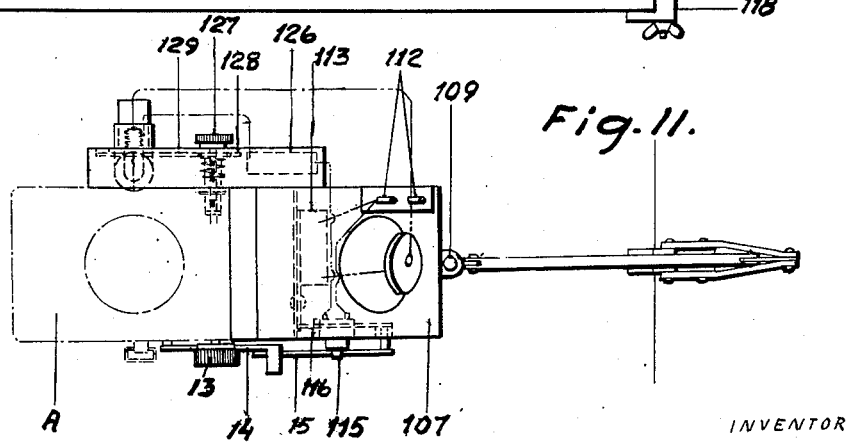

Fig. 1 shows a side view of the camera and Fig. 2 a plan view thereof. Fig. 3 shows a side view of the blind and its roller, and Figs. 4–7 show details of the mechanism of the camera. Figs. 8 and 9 show a side view and a plan view respectively of another embodiment of the camera and Figs. 10 and 11 show a side view and a plan view respectively of the camera stand.

About a roller B (Fig. 3) which is rotatable in a cylindrical drum A there is wound an unmasking device or blind, one end D of which is fastened to the roller. By turning the roller B with the aid of the knob or wheel 13 (Fig. 2), the free end E of the blind may be moved under the image aperture F in the bridge. Thus the image aperture becomes more or less screened according to the position of the blind, while the exposure field G is shortened and extended respectively in a corresponding manner.

The unmasking device may also be constructed in the form of a movable screen or a curtain system, simultaneously serving as a shutter.

On the shaft of the roller B is a pin H (Figs. 1–7) which consequently participates in the rotating motion at the adjustment of the unmasking device. The pin simultaneously actuates the control device.

On the shaft of the blind roller B are journalled the catch 2 (Figs. 1 and 2), with the nose 1 (Figs. 1, 4, 6 and 7) and the ratchet wheel 4 with the nose 3. The coil spring 5, which is secured to the blind shaft A and roller B, holds the nose 3 pressed against the pin H, so that the wheel 4 participates in the motion of rotation when the blind is adjusted. When the image aperture F is completely screened by the blind, the pin H as well as the wheel 4 with the nose 3 assume the position shown in Fig. 6. When adjusting the unmasking device for a desired length of the field of exposure, the blind shaft of the roller B is turned a longer or shorter distance in the clockwise direction, the wheel 4, which participates in this movement, thus assuming another position corresponding to the adjusted length of the field of exposure.

As seen from Fig. 5, the sprocket wheel 6 engaging the perforation of the film is rigidly connected with the toothed wheel 7. On the same shaft pivot as these wheels is also journalled a swingable plate 8, on which in turn is journalled a toothed wheel 9 engaging the wheel 7. Said swingable plate 8 furthermore has a locking nose 10, which locks the catch 2 (Fig. 1) engaging the stop wheel 11, while the swingable plate 8 is held in its position by the spring 12.

When the blind has been set for the desired size of the field of exposure by means of the wheel 13, the lever 14 (Fig. 2) is depressed at the exposure. Hereby the arm 15 (Figs. 1 and 4) provided with a hook is turned from the position K (shown in solid lines Fig. 4) to the position L (illustrated in broken lines Fig. 4). The shutter arm 16 (Fig. 1) is actuated by a pull rod and thus the exposure is effected. Through the draw spring 17 the arm 15 is restored to the position K, during which movement its hook first pushes up the swingable plate 8 so that the toothed wheel 9 engages the toothed wheel 4. Simultaneously herewith, the locking nose 10 of the swingable plate leaves its locking position and the catch 2 is released. During its continued movement the arm 15 then glides along the curve 18 of the swingable plate 8—whereby the swingable plate is retained with the wheel 9 in mesh with the wheel 4—and simultaneously the hook will push up the catch 2 from its locking engagement with the stop wheel 11. Thus the arm 15 has reassumed its position K. During its movement, however the catch 2 has caught the locking nose 10 of the swingable plate, whereby it retains the said plate with the wheel 9 in mesh with the wheel 4.

The catch is held in this position by the spring 12 (Fig. 4).

When the catch 2 is lifted, the film feeding clockwork is started. The film now turns the sprocket wheel 6 (Fig. 5) which engages the perforation, as well as the toothed wheel 7. Via the wheel 9 the latter turns the wheel 4 with the nose 3 from the position it assumed at the adjustment of the blind to the position shown in Fig. 6. In this position the nose 3 catches the nose 1 of the catch 2 and pushes the catch back to engagement with the stop wheel 11, whereby the clockwork is stopped. Simultaneously the locking nose 10 of the swingable plate is released, so that the spring 12 may turn the said plate back to its earlier position, the wheel 9 releasing its engagement with the wheel 4, which then by the spring 5 is restored to the set position. Thus, the cycle of operation is accomplished, and another exposure with the same or a changed setting of the field of exposure may take place.

In the embodiment shown in Figs. 8 and 9 there is wound up on a rotatable roller B' a blind consisting of a thin metal foil, one end D' of which is secured to the roller B', while the free part E' thereof runs in two grooves located on either side of and along the image aperture in the film bridge of the camera. A knob or wheel 13' is mounted on the shaft X' of the roller. Thus a rotation of the roller B' effected by means of the metal foil forwards and backwards in the grooves Z' in front of the film Y', which in this way becomes more or less unmasked.

A pin H' is fixed on the roller shaft X' and thus it participates in the rotary movement of the roller. On the roller shaft X' are furthermore movably journalled a sprocket wheel 1' engaging the perforation of the film and toothed wheel 2' which is rigidly connected with the wheel 1'. A toothed wheel 3', also movably journalled on the roller shaft X', has a nose 4'. Around said roller shaft there is placed a coil spring 5', one end of which is secured to the nose 4'. Thereby the spring 5' holds the nose 4' pressed against the pin H'. Thus, the wheel 3' will participate in the rotary motion of X' and B', when the unmasking blind A is adjusted and each position assumed by the unmasking blind A' will have its correspondence in a certain position (a certain angle of rotation) of the nose 4.

Two rigidly interconnected concentric toothed wheels 8' are movably journalled on the swingable plate 7'. The latter, in turn, is rotatably mounted on a pivot 6' and may be swung to such a position that the wheels 8' are caused to engage each one of the wheels 2'—3'. The said swingable plate is provided with shoulders 9' and 16'.

On a pivot 10' there is mounted a catch 11', which in a certain position engages a rocking member 12', which thereby locks a sprocket wheel pertaining to the film feeding spring mechanism. On the catch 11' is a nose 24' which, when the swingable plate 7' assumes such a position that its wheels 8' do not engage the wheels 2'—3', is retained by the shoulder 9' of the said plate, whereby at such a position of the swingable plate the catch 11' is prevented from leaving its engagement with the member 12 of the spring mechanism. On the other hand, when the swingable plate assumes such a position that its wheels 8' are in mesh with the wheels 2' 3' and the catch 11' has been swung out of engagement with the member 12', the shoulder 9' of the swingable plate 7' rests on the nose 24' of the catch 11' the swingable plate thus being retained with the wheels 8' in mesh with the wheels 2'—3'.

Accordingly, the catch and the swingable plate are locking one another in their respective working positions.

The spring 15' has one end thereof secured to the swingable plate 7' and the other end to the catch 11', and in this way it holds the swingable plate in such a position that the wheels 8' of the latter are not in mesh with the wheels 2'—3', the said spring at the same time also holding the catch 11' in engagement with the member 12'. The catch 11' is furthermore provided with a shoulder 17' as well as a shoulder 18'. By means of a spring 20', one arm of a movably journalled angle-lever 19' is held pressed against the shoulder 18. When the catch 11' is released from the member 12', the angle lever is turned by the spring 20' so that one arm thereof glides in beneath the shoulder 18', whereby the catch 11' is maintained from engaging the member 12'. Now the film feeding spring mechanism will be driven by its draw spring in the spring box 21'.

The numeral 22' designates a resilient hook provided on an arm 23', which is secured to the same shaft pivot as the releasing arm 14'.

When by means of the wheel 13' the unmasking blind has been adjusted for the desired size of the exposed film field, the releasing arm 14' is depressed at the exposure. Hereby the arm 23' is simultaneously turned clockwise to the position shown in the drawing, the resilient hook 22' gliding in beneath a shoulder 16' of the swingable plate. At this motion of the arm 23' the camera shutter is actuated simultaneously by means of a pull rod (not shown in the drawing) so that exposure takes place.

When the arm 23' is restored counter-clockwise to the initial position, the hook 22' catches the lower side of the shoulder 16 of the swingable plate and lifts the same so that its wheels 8' are caused to engage the wheels 2'—3'. The shoulder 9' of the swingable plate simultaneously releases the locking nose 24' of the catch. The hook 22' now glides past the shoulder 9' of the swingable plate, but during its continued counter-clockwise motion to the initial position it supports the swingable plate so that the latter is retained in the position assumed. During this continued motion the hook 22' also engages the lower side of the shoulder 17' located on the catch 11' and lifts the same out of engagement with the member 12'. Now the film feeding spring mechanism is started. Because the catch is lifted, however, the spring 20' can move the lever 19' in beneath the nose 18' of the catch, which thereby is retained in the position it has assumed. During the continued motion thereof, the hook 22' leaves the step 17', whereupon it reaches its initial position.

When the film feeding spring mechanism was started, the film commenced to turn the sprocket wheel 1' engaging the perforation thereof, as well as the toothed wheel 2' connected with the wheel 1'. The toothed wheel 2' turns the wheels 8' of the swingable plate, whereby the rotary motion is transmitted to the toothed wheel 3' with its nose 4', which is turned away from the position obtained at the adjustment of the blind and corresponding thereto, until the nose 4' abuts against the angle-lever 19', the other arm of which will thereby leave the previously assumed position beneath the nose 18'. Hereby the catch 11' is released, and the spring 15' can restore it to engagement with the member 12', the film feeding spring mechanism coming to rest. Simultaneously the lock nose 24' of the catch has released the shoulder 9' of the swingable plate, which can be restored to its previous position by the spring 15', the wheels 8' then being released from the wheels 2'—3'. Now the coil spring 5' can restore the wheel 3' with the nose 4' to the adjusting position with the nose 4' abutting against the pin H'. With this the cycle of operation is accomplished, and a new exposure at the same or another setting of the unmasking blind may be effected.

Figs. 10 and 11 show the stand in which the camera is mounted, preferably detachably. The stand comprises two arms 101, 102 and 103, 104 respectively, which are swingable relatively to each other and to the mounting 108, 118, each of said arms consisting of two rods which in a manner known per se are arranged to give parallel guidance of the camera. The stand head 107 is rotatably in the horizontal plane by means of bolts 109 and 110 and the stand as a unit is swingable about the pivot 108. As a consequence, the head 107 as well as the camera fixed thereto are movable in all directions, while the angle between the optical axis of the camera and the horizontal plane always may be kept permanent.

The stand head is provided with a support means 119, which keeps the camera at a predetermined distance from the text to be photographed. The latter is placed horizontally on a base 117 (a table plate or the like), to which the stand may be screwed by means of a clamping screw 118. The lower end of this support means also indicates one side of the text field which will be included in the reproduction.

Furthermore, the stand head is provided with a small glow lamp 120 of 35 v. and 0.05 a., placed in a tube 121, which is also equipped with lenses 122 and 123. Immediately beneath the condenser lens 122 is a wire 124, which thus will be projected down upon the text. The glow lamp 120 is supplied with current through contact pins 112 via a switch 125 and a resistance 126 of 1000 ohms.

The lamp tube 121 is turnable to a desired certain angle about an axis lying in the principal plane of the camera objective. At the setting of the unmasking device of the camera by rotation of the roller about which the blind is wound up, the said rotation is transmitted to the lamp tube by means of a bolt 127 which is insertable in a connection sleeve X1' of the camera connected with the shaft X', and furthermore by means of a toothed wheel 128 connected with the said bolt and a rack 129 as well as an arm 130 mounted on the lamp tube. In this way the projection of the text surface of the wire 124 will indicate the adjustment of the unmasking device and thus also that side of the picture field reproduced by the camera at a certain setting of the unmasking device, which opposes the side indicated by the support means.

Furthermore the stand head is provided with a glow lamp 111 (for instance a so-called photolamp of 9,000 lumen) being supplied with current through the contact pin 112. When the exposure releaser 14 of the camera is depressed for exposing purposes, the arms 115 and 116 of the camera are actuated, said last-mentioned arm in turn actuating a mercury switch 113 so that the lamp is lighted. When the releaser 14 is allowed to return to its original position, the lamp is switched off again in the same manner.

Having now described my invention, what I claim as new and desire to secure by Letters Patent is:

1. An apparatus for photographing an object such as a document, comprising, a camera having, in combination, means for variable unmasking of the field of image, means positionable for indicating the field reproduced by exposure, a controlling mechanism including a motor and a timer operative in response to said indicating means position and operable for automatic feeding of the film in correspondence with the adjustment of the unmasking means, a latch operable for releasably locking said motor during exposure operation and a trigger operable for film exposure and arranged to effectuate release of said latch after exposure.

2. In an apparatus according to claim 1, together with a roller, said means for unmasking the field of image comprising a flexible metal foil disposed on said roller.

3. In a photographic camera, an adjustable blind for varying the exposure gate, a turnable knob manually operable to adjust said blind, means settable by said knob from an initial position, a shutter including a trigger, a film-driven member, a film feed member, a motor in driving connection with said film feed member, and a mechanism comprising a releasable latch for locking said motor, transmission means including clutch means between said film-driven member and said settable means being operable for turning the latter to said initial position, said settable means being arranged for operating in said initial position said latch to lock said motor, and means actuable by said trigger after exposure to operate said clutch means and to release said latch.

4. A photographic camera as claimed in claim 3, further characterized in that said mechanism has spring means for returning said latch to its release position, and a lock operable to maintain said latch in latching and respectively in release position, under the impulse of said spring.

5. A photographic camera as claimed in claim 3, further characterized in that said mechanism has spring means for returning said settable means from said initial position to the set position, said latch being arranged, after the locking of the motor, to release said clutch for allowing the return of said settable means.

ANDERS VIKTOR HUGO ANDERSSON.

REFERENCES CITED

The following references are of record in the file of this patent:

UNITED STATES PATENTS

| Number | Name | Date |
|---|---|---|
| 1,847,531 | Kesses | Mar. 1, 1932 |
| 2,131,693 | Smith | Sept. 27, 1938 |
| 2,247,104 | Takacs | June 24, 1941 |
| 2,322,032 | Kunze | June 15, 1943 |
| 2,388,264 | Higonnet | Nov. 6, 1945 |
| 2,415,424 | Gaebel | Feb. 11, 1947 |
| 2,478,641 | Rose | Aug. 9, 1949 |
| 2,496,329 | Briechle | Feb. 7, 1950 |